April 21, 1970     C. L. TILLMAN III     3,507,506
PIPE JOINT SEAL
Filed Sept. 12, 1967
FIG. 2.
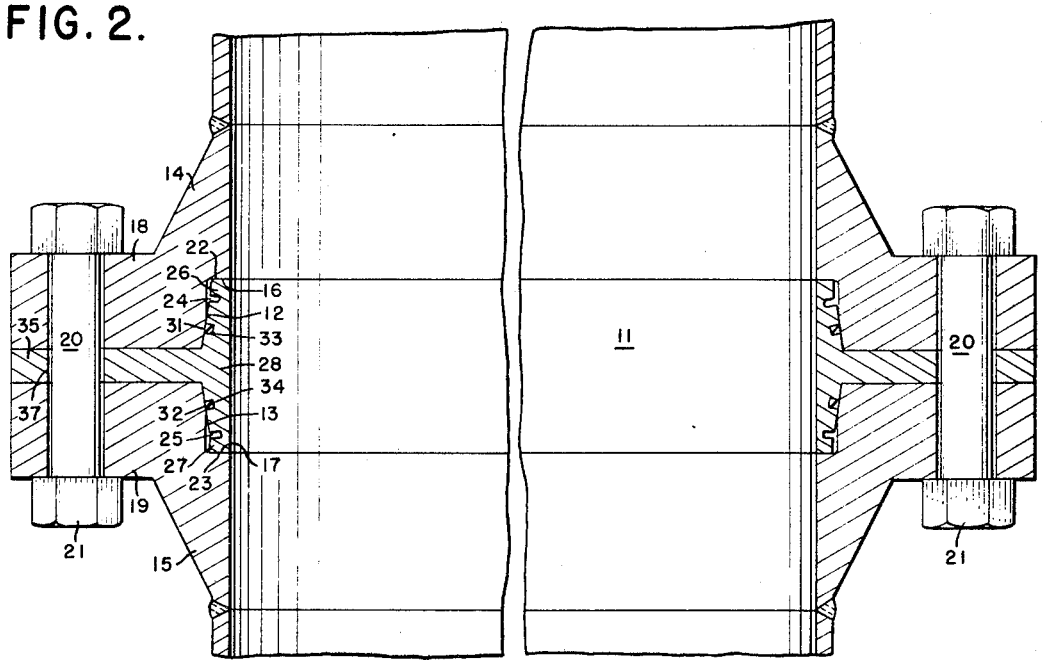
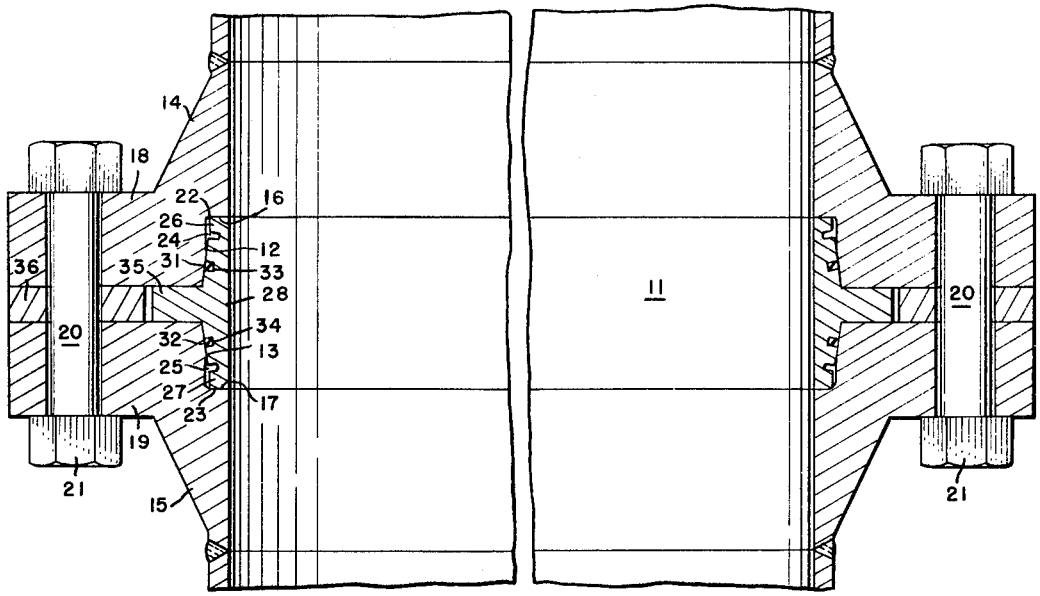
FIG. 1.
INVENTOR
CASSIUS L. TILLMAN III
BY *Albert J. Kramer*
ATTORNEY

United States Patent Office 3,507,506
Patented Apr. 21, 1970

---

3,507,506
PIPE JOINT SEAL
Cassius L. Tillman III, c/o Precision Rebuilders, Inc., P.O. Box 343, Peters Road, Harvey, La. 70058
Continuation-in-part of application Ser. No. 616,714, Feb. 16, 1967. This application Sept. 12, 1967, Ser. No. 667,260
Int. Cl. F16k *15/00;* F16l *23/00*
U.S. Cl. 277—225                                7 Claims

ABSTRACT OF THE DISCLOSURE

A pipe joint seal for large size pipes (such as 10″ diameter or larger) in the form of a tubular member having blunt ends is adapted to be disposed in blunt end recesses of aligned flanged pipes connected together under stressed conditions, such as by studs. Outer annular marginal grooves near the ends of the tubular members are provided to form noses that concentrate distortion under the stressed condition at the ends. A stiffening collar is provided integral with the middle section of the tubular member for disposition between adjacent flanges of the pipes. The collar may extend outwardly beyond the studs that hold the flanges together and are provided with apertures aligned with the studs; or, alternatively, it may not extend as far as the studs, in which case shims or washers are provided about the studs between the flanges to prevent distortion of the flanges.

---

This is a continuation-in-part of copending application, Ser. No. 616,714, filed Feb. 16, 1967, now abandoned.

In said copending application there is described a pipe joint seal in the form of a tubular member which is adapted to be disposed in recesses of aligned flanged pipes under stressed conditions. Marginal grooves form yieldable nose sections near the ends to concentrate distortion under the stressed condition at the ends resulting in a highly effective seal.

In order to form an effective seal in pipes of relatively large diameter, such as 24-inch diameter pipes and larger, it has been found necessary to provide a stiffening means in order to restrict the cross-section of the nose sections within functional limits.

Accordingly, the object of the present invention is the provision of an improvement in a joint seal of the type mentioned which will permit its use in pipes of large diameter and with high pressures.

A further object of the invention is the provision of such an improved seal which retains all advantages of the seal including nonturbulence of fluid passing through the joint, antiventuri action, tight fitting, reduction of hazards of handling dangerous fluids, the capability of installation without the use of special tools or equipment and the ability to use and reuse the seal without substantial injury.

Still further objects, advantages and features of the invention will be apparent from the following description considered together with the accompanying drawing.

In the drawing:

FIG. 1 is a cross-sectional view of an embodiment of the invention.

FIG. 2 is a cross-sectional view of a second embodiment of the invention.

The invention differs from prior types of seals, e.g., those described in Patents Nos. 2,766,998 and 2,766,999, wherein faces of the seals and the cooperating faces of the recesses are wedge shaped and, hence, effect an inward camming action when the pipe ends are drawn together. Such an arrangement also makes it difficult, if at all possible, to provide a flush relationship between the inner bore of the seal and the inner diameter of the pipes resulting in turbulent flow of fluid across the seal as well as venturi action. In the present invention, such turbulence and venturi action are avoided by making the inner diameter of the tubular seal member substantially the same as that of the inner diameter of the pipes and of such a blunt shape that stress is confined substantially axially of the seal and concentrated at the outer ends by means of yieldable noses provided by marginal grooves, thereby avoiding misalignment and resulting in a more effective seal, particularly under variations of relative movement of the connected pipes due to external forces, temperature changes, and other conditions which may affect the seal.

Referring with more particularity to FIG. 1 of the drawing, the embodiment illustrated comprises a tubular member 11 adapted to be disposed at either end in recesses 12 and 13 of aligned abutting pipes 14 and 15. The inner ends 16 and 17 of the recesses are blunt. The pipes typically contain flanges 18 and 19 by means of which the joint is tightened with conventional flange studs 20 and nuts 21.

The tubular member 11 has the same internal diameter as that of the pipes 14 and 15 and corresponding blunt ends 22 and 23.

The combined lengths of the recesses 12 and 13 are somewhat less than that of the tubular member 11 so that when the joint is completed by tightening the nuts 21 on the studs 20 longitudinal compressional pressure is exerted on the blunt ends of the tubular member. Recessed from either blunt end of the tubular member is an annular groove 24 and 25, respectively, to provide marginal nose sections 26 and 27, respectively, relatively more flexible than other parts of the member. By these means there is substantially prevented the transmission of distortion to the central section 28 of the member 11 under the compressional stress which might otherwise result from misalignment, machining variations or other factors.

The outer surface of the central section 28 is generally convex while the outer nose sections 26 and 27 extending beyond the grooves 24 and 25, respectively, are generally flat. The recesses 12 and 13 are made to correspond to these configurations, the inner ends 16 and 17 of the recesses being slightly wider than those of the corresponding nose sections 26 and 27 to allow for a degree of flexibility of the nose sections.

By these means also longitudinal distortion of the member 11 is concentrated at the nose sections permitting an exact mutual engagement between the central section 28 and the corresponding parts of the recesses 12 and 13.

Conventional surface seals 31 and 32 may be provided in grooves 33 and 34, respectively, of the central section 28 on either side of the joint line.

By these means it will be apparent that there is provided a stressed seal which yields to a degree under changes in the joint such as may be due to temperature, bending, etc. without interfering with the sealing of the joint. It is to be understood, however, that the stressing of the seal member should always be within its elastic limit so as to permit it to function properly.

The tubular member 11 may be made of any suitable metal, such as steel, and may be coated with different types of plastic flow or elastic material such as Teflon, Hycar, rubber, plastic, etc. Alternatively, it may be coated with silver, lead, zinc, cadmium, copper, etc. to provide a redistributable surface and thereby a tighter joint. It will also be apparent that by the use of the tubular member 11 there is facilitated the bringing together of the ends of the pipes in proper alignment when making up the joint.

Integral with the central section 28 of the tubular member 11 is a collar 35 which extends outwardly between the flanges 18 and 19. When the studs 20 are tightened the collar 35 is secured between the flanges and results in stiffening the tubular member. Shims or washers 36 are disposed about the studs between the pipe flanges to prevent distortion of the flanges against the collar by the studs. Alternatively, as shown in the embodiment of FIG. 2, the collar may extend outwardly beyond the studs 20 and be provided with aligned apertures 37 for the studs.

The parts are so proportioned that the thickness of the collar 35 is less than the difference between the length of the tubular member 11 and the combined lengths of the recesses 12 and 13 to a degree within the elastic limits of the parts stressed thereby.

This configuration may also be used with small sizes of pipe where design criteria of the adjoining parts make it desirable.

I claim:

1. A pipe seal comprising a single blunt ended tubular member and a joint of two axially aligned pipes of equal inside diameters, said pipes having corresponding blunt recesses in their adjacent ends and end flanges for closing the joint, said tubular member being inserted in said recesses with the ends of the tubular member engaging the end walls of the recesses, the length of said tubular member being greater than the combined lengths of said recesses, whereby the member is subjected to compressional stress on closure of the joint, said member having end portions delineated by marginal outer radially extending unfilled annular grooves to provide relatively resilient noses at said end portions under the compressional stress, the inside diameter of the tubular member being substantially the same as the inside diameter of the pipes.

2. A pipe joint seal as defined by claim 7 and two axially aligned pipes, said pipes having corresponding blunt recesses in their adjacent ends, said tubular member being disposed in said recesses and means forcing and holding the pipe flanges against the collar under stress sufficient to deflect the noses.

3. A seal as defined by claim 2 in which the inside diameter of the tubular member is substantially the same as the inside diameter of the pipes.

4. A seal as defined by claim 2 in which the forcing and holding means comprises threaded studs passing through apertures of the pipe flanges.

5. A seal as defined by claim 7 in which the stabilizing collar extends outwardly a distance less than the studs and shim means between the pipe flanges adjacent said studs.

6. A seal as defined by claim 7 in which the collar extends outwardly beyond the studs, said collar having apertures aligned with the studs.

7. A pipe joint as defined by claim 1 and a stabilizing collar integral with the central section of the member, said collar extending radially outward, the thickness of the collar being less than the difference between the length of the tubuluar member and the combined lengths of the recesses.

References Cited

UNITED STATES PATENTS

| | | | |
|---|---|---|---|
| 951,704 | 3/1910 | Schmidt | 285—334.2 |
| 1,197,863 | 9/1916 | Schreiber | 285—334.2 X |
| 1,426,724 | 8/1922 | Fyffe | 285—334.2 X |
| 2,517,290 | 8/1950 | De Moude et al. | 277—225 |
| 2,635,900 | 4/1953 | Mayo et al. | 285—334.2 X |
| 2,699,344 | 1/1955 | Bissell | 285—341 X |
| 2,775,471 | 12/1956 | Douglas | 285—334.2 X |
| 2,999,700 | 9/1961 | Smith | 285—334.2 X |
| 3,307,854 | 3/1961 | Hatfield | 277—225 X |
| 3,325,192 | 6/1967 | Sullivan | 285—341 X |

FOREIGN PATENTS

| | | |
|---|---|---|
| 1,234,100 | 2/1967 | Germany. |

LAVERNE D. GEIGER, Primary Examiner

J. S. MEDNICK, Assistant Examiner

U.S. Cl. X.R.

277—235; 285—334.2, 351, 363